Sept. 20, 1938.　　H. F. MAYNES　　2,130,671
FISHING REEL
Filed Nov. 4, 1937　　3 Sheets-Sheet 1

INVENTOR
Hyla F. Maynes,
BY
Beau, Brooks, Buckley & Beau
ATTORNEYS

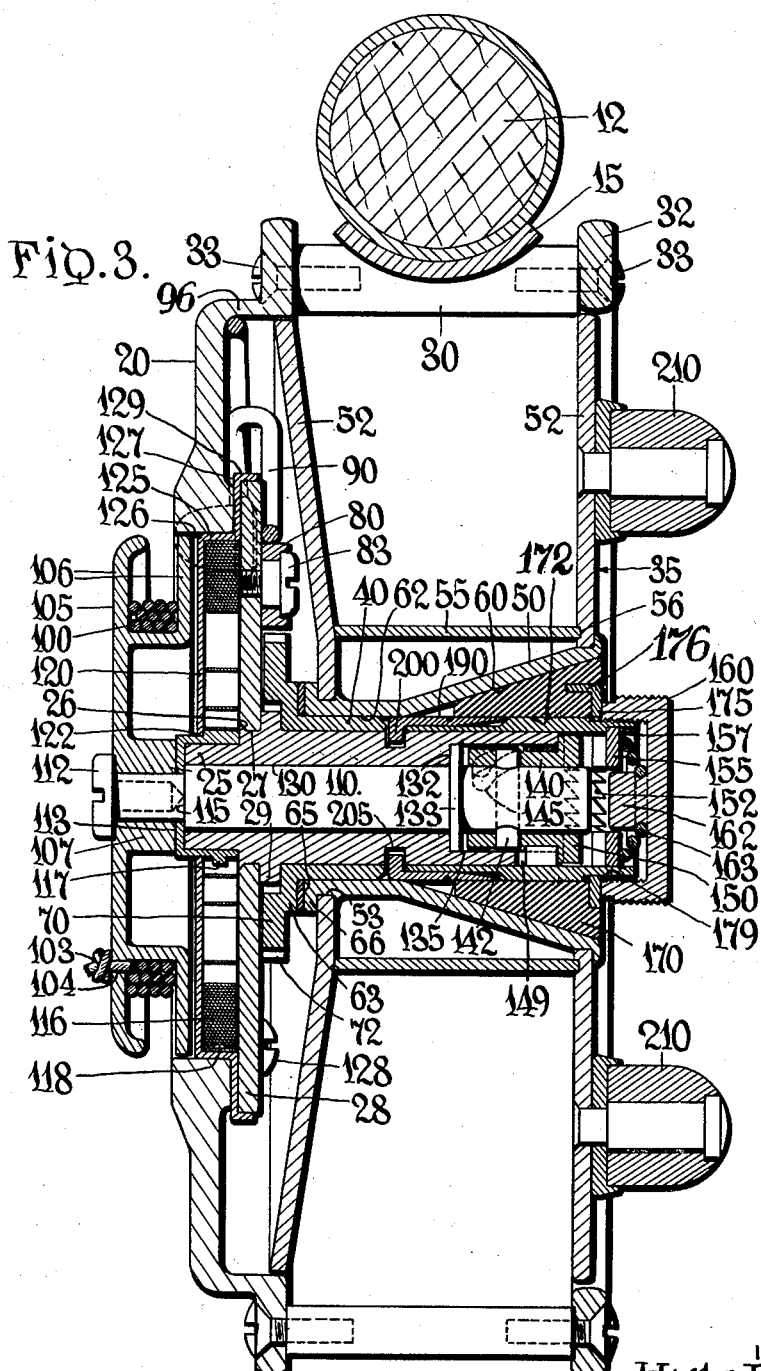

Sept. 20, 1938.　　　H. F. MAYNES　　　2,130,671
FISHING REEL
Filed Nov. 4, 1937　　　3 Sheets-Sheet 3
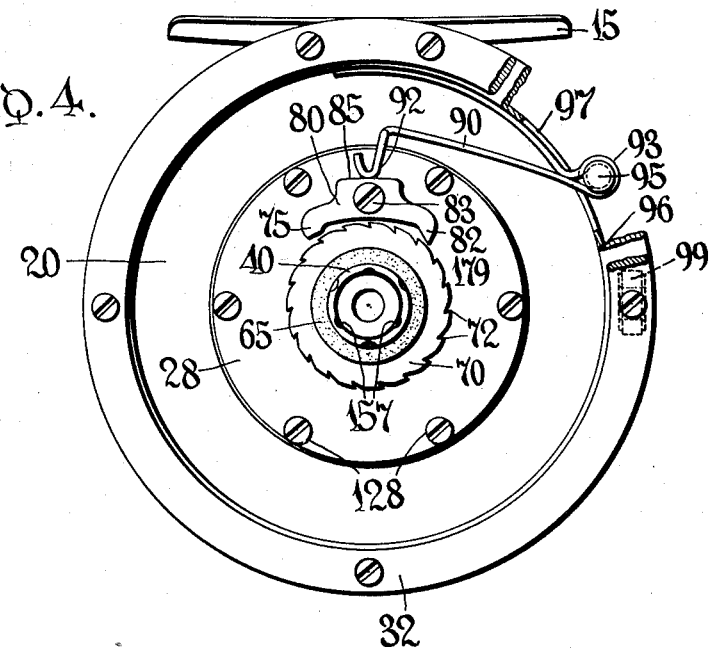
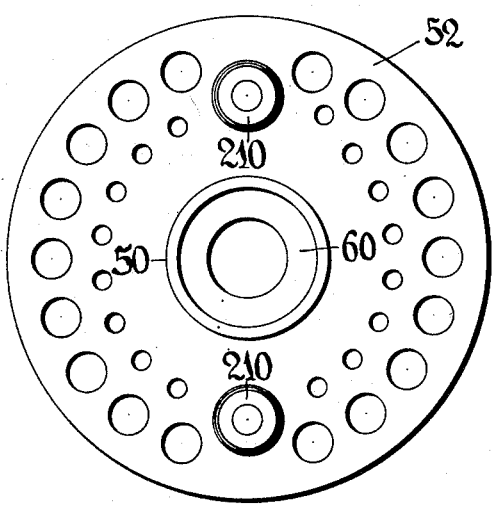
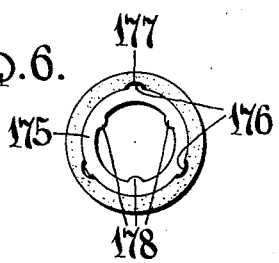
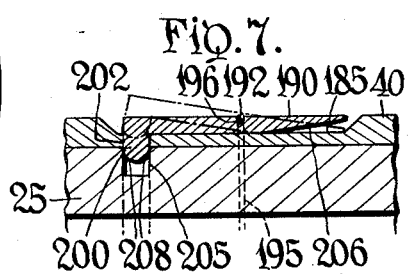
INVENTOR
Hyla F. Maynes,
BY
Beau, Brooks, Buckley & Beau.
ATTORNEYS Patented Sept. 20, 1938

2,130,671

UNITED STATES PATENT OFFICE 2,130,671

FISHING REEL

Hyla F. Maynes, North Tonawanda, N. Y., assignor of one-half to Emma C. Maynes, North Tonawanda, N. Y.

Application November 4, 1937, Serial No. 172,723

10 Claims. (Cl. 242—84.3)

This invention relates to fishing reels and it has particular relation to the structure and arrangement of a type of so-called trout reel.

The invention is related to, and constitutes improvement over, the reel structure described and claimed in my co-pending application Serial No. 105,555, filed October 14, 1936.

In utilizing the type of reel generally known as the trout reel, the rod grip is positioned on a rod in advance of the location of the reel, and the normal position of the rod and reel in use is such that the reel hangs from the lower side thereof adjacent the handle end of the rod. In handling a reel of this type it has previously been customary to take hold of the fishing line adjacent the reel and draw out so much length of line as is required for the type of operation desired.

After the fly, or the like, has been cast, the line is reeled in, either manually by operating a crank handle at one side of the reel, or in a certain type of automatic reel, by means of a spiral spring which is released to rotate the reel spool at the moment desired. When operating the automatic type of reel and the spring rapidly reels in the line with the fly thereon, care must be exercised to prevent the fly or the tip of the rod from being damaged by the fly striking the loops or line guides at the outer end of the rod.

If the reel is provided with a crank handle in this type of arrangement, the operator generally finds it necessary, in the various operations, to change hands and he thereby becomes involved in awkwardness and inconvenience in manipulation.

In a reel constructed according to the present invention, the manual drawing out of slack fishing line adjacent the reel is obviated, and complete control of the line can be insured by employing an improved arrangement wherein, to reel in the line, it is only necessary to pull out intermittently a length of cord from a pulley, upon which it is wound. The pulley is provided with a spring connected in such manner that, upon release of the cord, or by permitting the operator's hand to follow it back, the spring will cause the cord to be rewound upon the pulley. This pulley has clutch mechanism connecting it to the line receiving spool and the clutch mechanism positively engages only when the cord is drawn out to rotate the spool for purposes of reeling in the line. However, before actual release of the cord, the pulley maintains the positive clutching relation, and hence, the line receiving spool can be controlled for slow reverse rotation or held against reverse rotation that is, the operator can follow with his hand the movement of the outer end of the cord back to its wound up position on the pulley without releasing the clutch mechanism. During this action the cord must remain taut. Thus the operator has winding and braking control of the reel spool through the manipulation of the pulley actuating cord.

Other braking or slip clutch members are associated with the line receiving spool in such manner that, upon predetermined force being exerted outwardly upon the fishing line, the slip clutch members will permit rotation of the spool to relieve excessive load upon the fishing line. Also, provision is made to lock the spool against reverse rotation up to a predetermined load and then reverse rotation is permitted by operating the slip clutch. On the other hand forward rotation, that is, reeling in operation of the reel is accomplished by the manual actuation of the cord.

One object of the invention is to provide a fishing reel which has advantages superior to those of previously known types of automatic trout reels and in which disadvantages of these previously known types of reels are obviated.

Another object of the invention is to provide an improved assembly of clutching and braking mechanisms for fishing reels.

Another object of the invention is to provide an improved and combined braking and clicking mechanism.

Another object of the invention is to provide an improved slip clutch arrangement for fishing reels.

Another object of the invention is to provide an improved arrangement of disengageable structural elements for facilitating assembling and disassembling the parts of a fishing reel.

In the drawings:

Fig. 3 is a vertical section, on a larger scale, taken substantially along the line III—III of Fig. 1;

Fig. 4 is a side elevation of an inner side of one of the reel end sections and with portions of the reel removed;

Fig. 5 is a side elevation of the body of a spool of the reel;

Fig. 6 is a side elevation of a slip clutch employed in connection with the reel spool; and Fig. 7 is a fragmentary longitudinal section of a locking arrangement employed in assembling portions of the reel.

Figure 1:
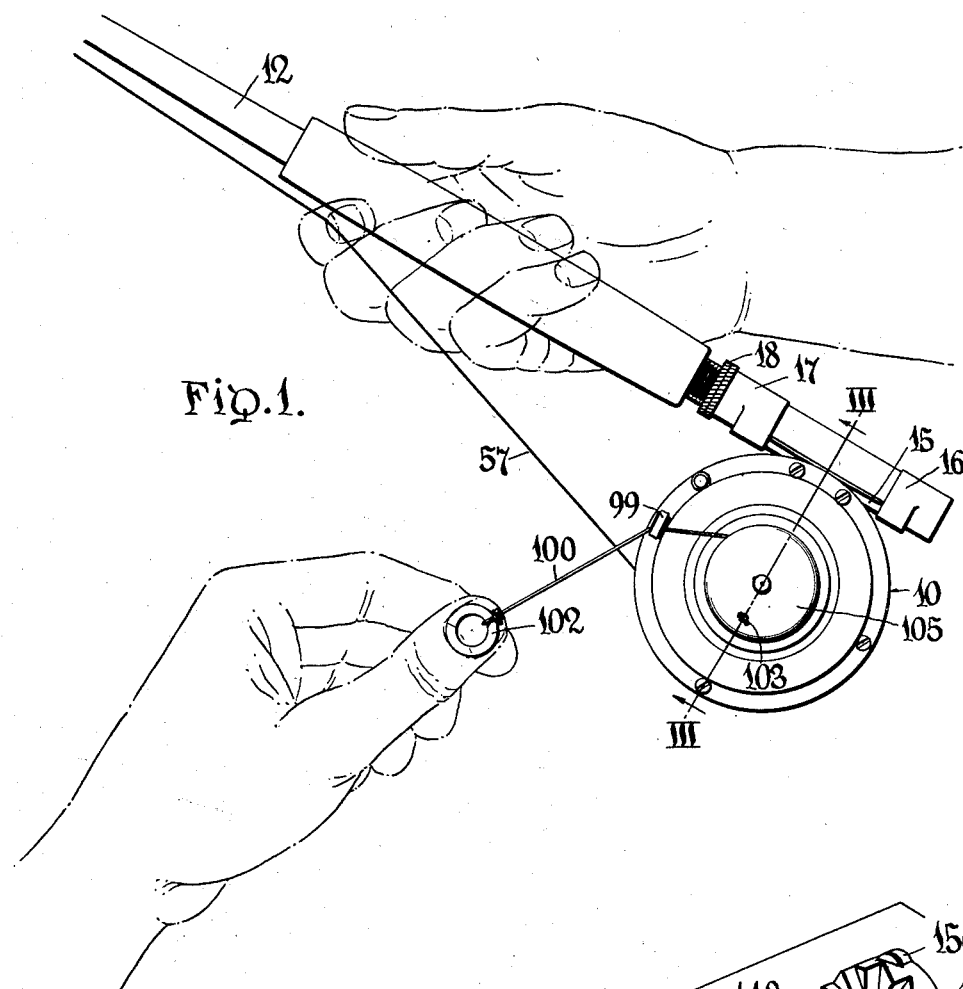
Fig. 1 is a side elevation of a fishing reel illustrating the manner in which it is installed for operation upon a rod.
Figure 2:
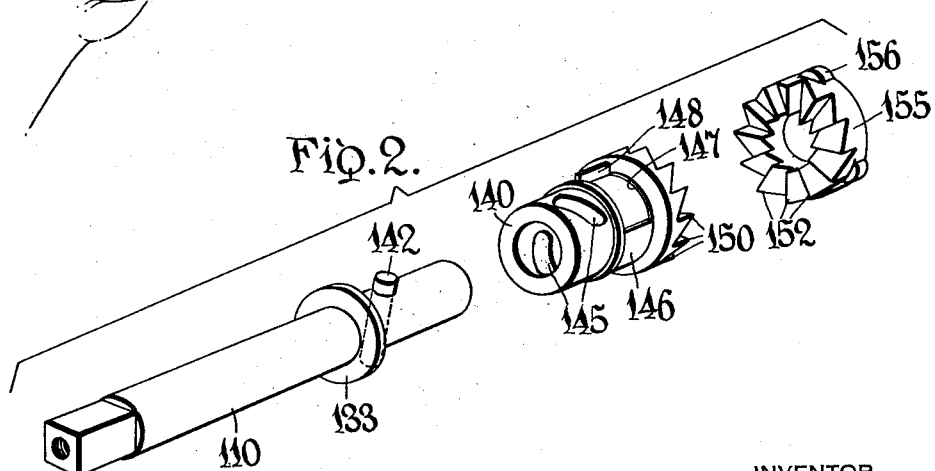
Fig. 2 is an exploded perspective of clutch mechanism and shaft included in the operating mechanism of the reel.

Referring to Figs. 1 to 3, a fishing reel 10, particularly designed for fly casting, or the like, is secured to a casting rod 12 by means of a saddle 15 having its ends connected in ferrules or sleeves 16 and 17, the latter of which is axially adjustable upon the rod by means of a nut 18 screwthreaded upon the latter to permit proper assembly and disassembly of the reel and rod. The saddle 15 is rigidly secured to a spool supporting casting or frame 20 of the reel.

One side of the frame 20 is provided with a bearing sleeve 25 rigidly secured, as indicated at 26, in an opening 27 formed in a plate-like casing or frame wall 28 and is provided with a shoulder or annular flange 29 which abuts the inner side of the frame wall adjacent the opening. The outer marginal portion of the frame 20 is provided with spacing posts 30 rigidly supporting an annular frame member or ring 32 that is disposed coaxially with respect to the sleeve 25 and is circumferentially spaced from the sleeve end opposite that which is connected to the frame wall 28. The posts 30 constitute the sole support of the ring 32 upon the frame 20. Suitable fastening elements 33, such as screws or bolts, secure the posts rigidly to the outer marginal portion of the frame wall 20 and to the ring 32.

The sleeve 25 rotatably carries a reel spool 35 that includes inner and outer hub sections 40 and 50 surrounding the sleeve and has opposed flanges 52 rigidly mounted, as indicated at 53, adjacent opposite ends of the hub outer section 50. It will be noted that the frame 20 is open on one side to provide for freely receiving the spool axially upon the sleeve through the ring 32. A substantially cylindrical drum 55 surrounds the hub sections and is rigidly mounted, as indicated at 56, between the flanges 52 of the spool for receiving fishing line 57 to be wound thereon.

The outer hub section 50 is so formed as to provide an outwardly flared or conical opening 60 extending toward the outer end thereof, and this opening communicates at an intermediate portion of the hub with a cylindrical opening 62 extending to the opposite end of the hub. The cylindrical and conical openings are coaxial. The inner hub section 40 is substantially cylindrical and is provided with a radial bearing shoulder 63 at its inner end, upon which a gasket 65 is disposed for receiving in abutting relation the inner shouldered end 66 of the outer hub section 50.

One end of the inner hub section 40 is also provided with a radial flange 70 having ratchet teeth 72 formed circumferentially thereon and equidistant from the axis of rotation of the spool. The shoulder 29 of the bearing sleeve 25 receives one end of the inner hub section 40 in abutting relation.

The circumferential ratchet teeth 72 are slidably engageable with a camming and braking end portion 75 (Fig. 4) of a substantially arcuate lever 80 which also serves as a pawl. The other or pawl end 82 of the lever is engageable with the teeth 72 for selectively locking the inner hub section 40 against rotation in one direction and for releasing the teeth in the opposite direction of rotation of the hub section 40.

An intermediate portion of the pawl and brake lever 80 is pivoted upon a bolt or pin 83 suitably secured upon the stationary frame wall 28 of the reel. The brake and pawl lever 80 is also provided with a central section 85 extending toward opposite ends thereof from the location of the pivot pin 83. A resilient lever controlling arm 90 is provided with a finger 92 formed at one end thereof for engaging under force of the resiliency of the arm 90 upon the surface 85 of the lever. An intermediate portion of the resilient arm 90 is provided with a loop 93 in which a headed pin 95 is secured to form a manually operable handle or button by which the arm is actuated. The other end portion or fork of the resilient arm is curved to correspond to the curvature of a cylindrical flange 96 of the end plate or frame 20 of the reel and against which the resilient arm rests in sprung relation. A slot 97 formed circumferentially in the cylindrical flange receives the adjacent reaches of the arm 90 in slidable relation therethrough and is offset radially from the location of the lever supporting pin 83 with reference to the axis of rotation of the reel spool.

In a neutral position of the resilient arm in the slot 97 the finger 92 bears upon the central portion of the section 85 and maintains the opposite ends 75 and 82 out of contact with the ratchet teeth 72. By moving the button 95 to the left (Fig. 4) the braking end 75 of the lever engages the teeth in braking relation and there will be slight clicking action when the hub section 40 is rotated. The braking action can be gradually increased by moving the finger toward the end 75. However, in this position of the elements, the ratchet flange 70 can rotate in either direction, so far as the lever is concerned.

By moving the button 95 to the right (Fig. 4) the resilient arm 90 urges the pawl end 82 of the lever into engagement with the ratchet teeth 72, and hence definite clicking action is secured in clockwise rotation of the hub section 40 or spool, and this hub section is locked by the pawl end of the lever with respect to counter-clockwise direction of rotation of the hub section 40.

At a location readily accessible for manual actuation a ring 99 or like element, through which a cord or line 100 can be threaded, is mounted upon the outer wall of the frame 20. The inner surface of the ring upon which the cord rides is of considerable width in order to provide suitable surface to prevent excessive frictional wear on the cord. An enlargement 102, such as an inherently stiff or rigid loop or ring, which will not slip through the ring 99 is connected to the outer end of the cord 100 for manual actuation of the latter in an outward direction, and the cord which has its inner end knotted, as indicated at 103, extends through an opening 104 in the wall of a rotatable pulley 105 between flanges 106 formed on the latter. The cord can be threaded from the outside through the opening 104 and hence, can be readily replaced in the event of failure. This pulley has a central hub 107 that is rigidly connected to an outer end portion of a shaft 110 for rotation on the outer side of the reel frame 20 and is held against axial displacement from the shaft by means of a screw 112 threaded axially into the shaft end. A bearing cup 113 is clamped between the pulley hub and a shoulder 115 formed on the shaft 110 and has bearing engagement with the end portion of the stationary bearing sleeve 25.

An inner end or convolution of a spiral spring 116 has a positive connection 117 for securing it to the flange of the bearing cup 113, and the outer end of the spring has a positive connection 118 for securing it to the inner wall of a stationary drum 120 that has a central opening 122 through which the cup 113 is partially disposed for rotation therein. The drum 120 has an outer cylindrical section 125 which fits into an opening 126 formed in the reel frame and the cylindrical section is provided with a radial flange 127 lying against the inner wall surface of the frame 20 and secured rigidly thereto by means of suitable fastening elements 128. The outer marginal portion of the flange 127 is lapped laterally, as indicated at 129, upon the outer circumferential edge of the plate 28 through which the fastening elements 128 also extend. Thus the reel frame 20, drum 120, plate 28 and bearing sleeve 25 constitute a rigidly assembled stationary structure. There is unobstructed circumferential opening or space between the flanges 106 of the pulley 105 to provide access to the cylindrical portion of the drum surface upon which the cord 100 can be wound without disassembling any part of the reel structure. The cord is simply connected and manually wound upon the pulley, and if such cord becomes worn, or for other reasons is to be replaced, the operations necessary can be accomplished with minimum inconvenience.

The shaft 110 is rotatably carried in a bearing opening 130 formed axially in the bearing sleeve of the stationary portion of the reel structure, and the intermediate portion of the sleeve at the inner extremity of the bearing opening is formed with an annular shoulder 132 which abuts in bearing relation a flange or shoulder 133 formed rigidly on an intermediate portion of the shaft. The outer portion of the bearing sleeve is recessed to form a cylindrical chamber 135 which is larger in diameter than the bearing opening 130 and receives therein a clutch sleeve 140 that is slidable axially upon the shaft and is also rotatable to a limited degree thereon.

As best shown in Figs. 2 and 3, a pin 142 projecting radially and rigidly from opposite sides of the shaft 110 is slidable adjacent each end in a slot 145 that is diagonally or helically formed through the wall of the clutch sleeve 140. Therefore, rotation of the shaft 110 in one direction causes a camming action of the pin 142 in the slots and tending to slide the clutch sleeve to the left (Fig. 3), and rotation of the shaft in the opposite direction provides camming action of the pin in the slot tending to slide the clutch sleeve to the right.

A resilient split ring 146 is disposed in an annular recess 147 formed in the outer periphery of the clutch sleeve, and a radial flange or finger 148 formed on one end of the split ring is slidable axially in a slot 149 formed in the inner surrounding wall of the bearing sleeve chamber 135. This ring resiliently engages the inner periphery of the chamber wall of the sleeve and by virtue of its confinement between the walls of the groove 147 and sleeve 25, such ring provides a one-way brake or clutch influencing rotation of the clutch sleeve 140.

The outer end of the clutch sleeve 140 is formed with one-way clutch elements 150 which are engageable with companion clutch elements 152 formed upon the inner end of a clutch sleeve 155. Radial projections or feathers 156 are formed at spaced locations upon the outer circumferential portion of the clutch sleeve 155 and these projections slidably engage in grooves 157 formed axially in the inner circumferential portion of the inner hub section 40. The clutch sleeve 155 is thus slidably guided coaxially with respect to the shaft 110 and clutch sleeve 140, as well as with respect to the hub section 40. An internally screw threaded cap 160 is provided with an inner central stud 162, the latter of which is disposed coaxially with the shaft 110 inside the clutch sleeve 155, and the cap is screw threaded axially upon the outer end of the inner hub section 40. A coil spring 163 under compression is secured to the stud and constantly urges the clutch sleeve 155 toward the inner ends of the grooves 157. The clutch sleeve 155 is thus yieldably mounted and insures proper release of the clutch teeth 150 and 152 incidental to disengagement of the clutch members.

A conical brake shoe 170 is fitted into the conical opening 60 of the outer hub section 50, and is provided with an inner cylindrical opening 172 in which the inner hub section 40 is disposed. The outer end of the brake shoe 170 (Figs. 3 and 6) is provided with an anchoring ring 175 partially embedded therein and provided with outer ribs 176 fitted in grooves 177 of the shoe to prevent relative rotation of these elements. The inner peripheral portion of the ring 175 is provided with inner projections 178 slidably fitted in grooves 179 that are formed longitudinally in the outer surface of the inner hub section 40. Upon screwing the cap 160 upon the end of the inner hub section 40, the inner cap end contacts the ring 175 and wedges the brake against the conical wall defined by the conical opening 60 of outer hub section 50.

Diametrically opposite sides of the inner hub section 40 are provided with longitudinally disposed recesses or grooves 185 in which a pair of dogs 190 are disposed in such manner that the outer surface of each dog is substantially flush with the outer surface of the hub section. An arcuate resilient wire 192 is disposed in a groove 195 formed circumferentially of the inner hub section 40 and is connected in recesses 196 of the dogs for the purpose of holding them in proper position in the grooves 185. Fingers 200 formed angularly upon the inner ends of the dogs extend loosely through openings 202 through the wall of the inner hub section 40 and into a circumferential or annular groove 205 formed in the outer wall of the bearing sleeve 25. The outer end portion of each dog is provided with inclined surface 206 normally extending away from the bottom of the groove and by pressing radially of the hub section upon the inclined end of the dog, the latter is pivoted about its intermediate portion to release the finger 200 from the annular groove 205. Normally in assembled relation of the parts of the reel, the dogs 190 can not be actuated from the groove 205 because of the inclosing relation of the cylindrical portion of the outer hub section 50 thereabout. However, in disassembling the elements of the reel, the cap 160 can be removed, and then the conical brake shoe 170, together with the hub section 50, can be slipped outwardly from the inner hub section. Then the dogs are exposed for manual actuation and release in order that the inner hub section 40 can also be slipped from the bearing sleeve 25. If desired, each finger can be provided with inclined cam faces 208 which will automatically pivot the dog out of engagement with the groove after the outer hub section 50 has been removed and force is applied for sliding the inner hub section axially from the bearing sleeve. Likewise, in assembling the inner hub section 40, the cam faces 208 will automatically operate upon the bearing sleeve and pivot each dog to a position for automatically snapping the finger 200 into the groove 205 when it reaches the point of registering therewith.

After the outer hub 50 has been assembled about the inner hub 40, the dogs can not be disengaged regardless of whether they are provided with camming faces, or with straight faces of the kind shown in Fig. 3.

It is to be understood that rotation of the spool can be manually accomplished by manipulating either of the crank handles 210 mounted upon the outer flange 52 and disposed diametrically opposite each other for the purpose of maintaining proper balance of the spool.

In operating the reel, braking action or drag, if desired, can be provided by manipulating the button or head 95 for adjusting the brake and pawl lever 80 into proper position, and the cap 160 is screwed down to provide the proper resistance according to the strength of the fishing line or according to the otherwise selected amount of resistance desired.

In certain types of casting operations considerable length of line is manually drawn from the spool in order to provide the proper line length for the cast; or the fly or plug can be cast while the spool permits proper extension of the line. In reeling in the line, the operator takes hold of the ring or loop 100 and pulls out the cord 102, as indicated in Fig. 1. This action winds up the spiral spring 116. Since the cord is connected to the pulley 105, which is in turn rigidly connected to the shaft 110, this linear actuation of the cord will be translated into rotative motion to rotate the shaft, and at the same time, the pin 142 will operate in the slot 145 to slide the clutch elements 150 into engagement with the clutch elements 152. Then a driving connection is established between the shaft and the spool 35. This driving connection is established almost instantaneously with the beginning of the outward movement of the cord 100 and the latter can be drawn out any distance commensurate with its length or the length of the operator's arm.

After the cord has been drawn outwardly a desired distance, the operator then moves his hand back toward the ring 99, and the spiral spring 116, which has been wound up during the outward stroke, unwinds and winds the cord 100 back upon the pulley 105. This action concurrently causes rotation of the shaft in a direction of rotation opposite that in which the shaft was rotated by pulling out the cord. This rotation automatically disengages the one-way clutch elements 150 and 152. The torsional force of the spring responds very rapidly when the operator permits the cord 100 to be wound on the pulley and the cord can be actuated inwardly and outwardly to and from the pulley as rapidly as the operator desires. During this movement the spool is intermittently rotated in the same direction, i. e., in the reeling-in direction, while very slight, if any, reeling-out is permitted. In fact the instant any tendency toward reeling-out the line occurs the cord 100 can be drawn outwardly again, or the pawl end of the lever 80 can be set so as to prevent reeling-out of the line 57 until such force is applied thereto that will overcome the frictional resistance of the conical slip clutch element 170.

In this connection, it is to be understood that the loop 102 of the cord can be held by the operator and permitted to return slowly while maintaining the cord 100 under tension. Under such conditions the clutch members 150 and 152 will remain engaged and reverse rotation of the reel spool can be accomplished only against the braking action of the conical brake shoe 170. In fact the loop of the cord 100 can be so manipulated in its return movement that it is not released until it rests against the stop ring 99 at the side of the reel frame and the clutch elements 150 and 152 will still remain engaged. However, even the slightest momentary slackening of the cord 100 will release the clutch elements 150 and 152 until the cord is again drawn outwardly. Thus control is maintained from the cord 100 through the clutch members and conical shoe to the line receiving portion of the spool unit 35.

This type of cord control can be employed alone, or the cord 100 can be manipulated in co-operation with the pawl 82 and coacting ratchet teeth 72. When the lever 80 is adjusted to such position as to provide ratcheting action between the teeth 72 and pawl end 82 of the lever, the inner section 40 of the spool 35 is positively locked against reverse rotation, that is, the spool section 40 is positively locked against movement in a counter-clockwise direction, as viewed in Fig. 4, and the outer spool section 50 can rotate reversely only against the frictional resistance provided by the conical shoe 170. On the other hand, the spool unit 35 can be controlled by the cord 100 when the lever 80 is in such position as to hold the pawl 82 free from contact with the ratchet teeth 72. Assuming that a load on the fishing line is applying forces tending to unwind it from the spool unit, the operator can, while maintaining the cord 100 taut, permit such cord to be wound slowly upon the pulley 105, without disengaging the clutch elements 150 and 152. During this operation the spiral spring 116 is restrained in its action. So long as there is a load on the fishing line exerting forces tending to unwind the line from, and rotate, the spool unit, the clutch elements 150 and 152 remain engaged because the application of relative forces among the engaging clutch elements remains substantially the same; that is, the direction of application of such forces is such as to cause positive clutching engagement. Such conditions are true regardless of the actual direction of rotation of the spool unit and pulley under control of the cord 100. If desired the operator can permit the cord 100 to be wound relatively slowly upon the pulley until the enlargement 102 is stopped against the ring 99 and the clutch elements will then remain positively engaged until the fishing line becomes slack, or until the cord 100 is again actuated. As soon as the operator, through actuation of the cord 100, permits the spring 116 to rotate the shaft 110 at a faster speed than the load on the fishing line tends to rotate the spool unit, as the line is unwound, or if there is no load on the fishing line, the clutch elements will be disengaged and they will not become re-engaged until the cord is again drawn outwardly.

These various kinds of control for the fishing reel provide for improved and simple operation of the reel, and enhances the pleasure and sport of fishing.

It is to be understood that the braking action upon the spool provided by the conical brake shoe 170 can be varied according to the desires of various individuals. However, it is generally advisable to provide a braking action that will insure frictional slipping before the tensile strength of the cord 100, or the strength of the fishing line 57, is overcome. That is, the brake elements provide a safety factor to prevent failure of the cord 100, or other elements of the reeling-in arrangement.

Although only one form of the invention has been shown and described in detail, it will be apparent to those skilled in the art that the invention is not so limited, but that various changes can be made therein without departing from the spirit of the invention or from the scope of the appended claims.

I claim:

1. In a fishing reel, supporting structure including a bearing support assembled therewith, a spool unit rotatably mounted upon the bearing support and including relatively rotatable inner and outer sections, slip clutch mechanism carried by said sections for opposing relative rotation of the latter, connecting means between one of the sections and the supporting structure and operable to oppose rotation of the unit upon the bearing support, and a pair of actuating means connected to the outer section and inner section, respectively, for applying rotative force to said outer and inner sections, respectively, whereby rotative force can be applied through the slip clutch from the outer to the inner section or from the inner to the outer section.

2. In a fishing reel, supporting structure including a bearing support assembled therewith, a spool unit rotatably mounted upon the bearing support and including two relatively rotatable sections demountable with respect to each other and with respect to the bearing support, a locking member releasably engaging one of said sections and the bearing support when the other section is demounted, said other section engaging the locking member to maintain the spool unit upon the supporting bearing support in the assembled relatively rotatable relation of the sections and support, means provided on said sections for opposing relative rotation of the latter, connecting means between one of the sections and the supporting structure and operable to oppose rotation of the unit upon the supporting structure, and means connected to the spool unit for rotating it.

3. In a fishing reel, supporting structure including a bearing support assembled therewith, an inner sleeve rotatably mounted upon the bearing support and slidable axially into and out of assembled relation therewith, a locking device having a portion movable substantially radially of the support and engaging the support and sleeve and releasably locking said sleeve against axial displacement from the support, an outer line winding spool sleeve mounted upon the inner sleeve and slidable axially into and out of assembled relation therewith, means providing a slip clutch between said sleeves, means securing the sleeves against relative axial displacement, and means for rotating the sleeves as a unit upon the support.

4. In a fishing reel, supporting structure including a bearing support assembled therewith, an inner sleeve rotatably mounted upon the bearing support and slidable axially into and out of assembled relation therewith, said sleeve and support having interengageable means normally maintaining the sleeve against axial displacement from the support and automatically actuatable in response to movement of the sleeve axially of the support to provide for assembly and disassembly thereof, an outer line winding spool sleeve slidable axially into and out of assembled relation with the inner sleeve and in its assembled relation holding said means in position to lock the inner sleeve against axial movement on the support, means providing a slip clutch between said sleeves, means securing the inner and outer sleeves against relative axial movement, and means for rotating the sleeves as a unit upon the support.

5. In a fishing reel, a supporting structure including a bearing support assembled therewith, a line receiving spool unit rotatable upon said support, an annular row of ratchet teeth carried by the rotatable spool unit coaxially thereof, a clicker member carried by the supporting structure and having a portion yieldably engageable with said spool unit in frictional relation, said member having another portion movable into ratcheting relation with the teeth to lock the annular row of teeth against rotation in one direction, and means for selectively actuating said clicker member into clicking or ratcheting engagement with the teeth.

6. In a fishing reel, a supporting structure including a bearing support assembled therewith, a line receiving spool rotatable upon said support, an annular row of teeth carried by the spool coaxially thereof, a brake-and-pawl-lever pivoted upon the supporting structure and having a braking portion slidably engageable with the teeth in two-way braking relation, said lever having a pawl portion engageable in one way locking relation with the teeth, and means for selectively urging said portions of the lever against the teeth.

7. In a fishing reel, a supporting structure including a bearing support assembled therewith, a line receiving spool rotatable upon said support, an annular row of teeth carried by the spool coaxially thereof, a clicker structure carried by the supporting structure and having a portion yieldably engageable with the teeth in two-way braking and clicking relation, said clicker structure having another portion movable into ratcheting relation with the teeth, said clicker structure including a resilient arm extending to the outside of the supporting structure for manual operation and selectively actuatable to yieldably urge either of said portions into contact with the teeth.

8. In a fishing reel, a supporting structure including a bearing support assembled therewith and including a slotted wall section partially surrounding the bearing support, a line receiving spool rotatable on said bearing support, and annular row of teeth carried by said spool inwardly of said wall portion, a clicker structure carried by said supporting structure and having a portion yieldably engageable with said teeth in two-way braking relation, said clicker structure having another portion movable into ratcheting relation with the teeth, said clicker structure including a resilient arm extending through the slotted wall section and having a portion sprung against the inner side of the wall section, said resilient arm being manually and selectively actuatable to yieldably urge either of said portions into contact with the teeth.

9. In a fishing reel, a supporting structure including a bearing support and having a reel actuating shaft rotatably carried axially thereof, a line receiving spool unit rotatably mounted upon the bearing support, said supporting structure also including a plate radiating from the bearing axis of said bearing support, a drum having a cylindrical portion and rigidly mounted upon the plate, an outer circumferential frame member having an opening and rigidly assembled with the plate and drum with said cylindrical portion disposed in said opening, a coil spring in the drum having one end connected to the shaft and the other end connected to the drum, a pulley rigidly mounted upon the shaft and having a cord wound thereon for rotating the shaft against the resiliency of the spring, and means engageable with the shaft and the spool unit for transmitting rotative motion from the pulley to said spool unit.

10. In a fishing reel, supporting structure including an axially recessed bearing support assembled therewith, a spool unit rotatably mounted upon the bearing support and including relatively rotatable sections, said sections including frictional slip clutch mechanism opposing relative rotation of said sections, control means operable in said recessed portion of said bearing support and including one-way driving clutch elements normally in disengaged neutral relation, means connecting said control means to one of said sections, resilient means connecting said control means to said supporting structure and yieldably resisting relative movement of said clutch elements from a neutral position, and actuating means connected to the control means whereby the clutch elements are relatively movable into positive engagement to effect positive driving connection with said one section.

HYLA F. MAYNES.